(12) United States Patent
Nickl

(10) Patent No.: US 11,181,410 B2
(45) Date of Patent: Nov. 23, 2021

(54) MEASUREMENT DEVICE FOR ASCERTAINING A FLUID VARIABLE RELATING TO A FLUID AND/OR A FLUID FLOW

(71) Applicant: DIEHL METERING GMBH, Ansbach (DE)

(72) Inventor: Stefan Nickl, Stein (DE)

(73) Assignee: Diehl Metering GmbH, Ansbach (DE)

( * ) Notice: Subject to any disclaimer, the term of this patent is extended or adjusted under 35 U.S.C. 154(b) by 112 days.

(21) Appl. No.: 16/783,207

(22) Filed: Feb. 6, 2020

(65) Prior Publication Data

US 2020/0173826 A1 Jun. 4, 2020

Related U.S. Application Data

(63) Continuation of application No. PCT/EP2018/000342, filed on Jul. 4, 2018.

(30) Foreign Application Priority Data

Aug. 9, 2017 (DE) .............................. 102017007494

(51) Int. Cl.
G01F 1/696 (2006.01)
G01F 1/69 (2006.01)

(52) U.S. Cl.
CPC ............... *G01F 1/696* (2013.01); *G01F 1/69* (2013.01)

(58) Field of Classification Search
CPC ... G01F 1/00; G01F 1/69; G01F 1/696; G01F 23/00
See application file for complete search history.

(56) References Cited

U.S. PATENT DOCUMENTS

| 4,885,931 | A | * | 12/1989 | Horner | G01F 23/14 |
| | | | | | 73/49.2 |
| 4,934,189 | A | | 6/1990 | Tanimoto et al. | |
| 5,416,430 | A | | 5/1995 | Twerdochlib et al. | |
| 6,085,599 | A | * | 7/2000 | Feller | G01F 1/60 |
| | | | | | 73/861.13 |
| 7,535,235 | B2 | | 5/2009 | Molnar | |
| 2009/0266442 | A1 | * | 10/2009 | Duscher | G01F 23/243 |
| | | | | | 141/95 |
| 2011/0110794 | A1 | * | 5/2011 | Mayleben | F04B 23/021 |
| | | | | | 417/53 |
| 2017/0343401 | A1 | * | 11/2017 | Arnold | G01F 1/6842 |

FOREIGN PATENT DOCUMENTS

| DE | 19609579 A1 | 9/1997 |
| EP | 683383 A1 * | 11/1995 |
| WO | WO-2015142143 A1 * | 9/2015 | ........... G01F 23/266 |

* cited by examiner

*Primary Examiner* — Francis C Gray
(74) *Attorney, Agent, or Firm* — Laurence A. Greenberg; Werner H. Sterner; Ralph E. Locher

(57) ABSTRACT

A measurement device for ascertaining a fluid variable relating to a fluid and/or a fluid flow of the fluid, includes a computing device and a sensor module or a plurality of sensor modules for acquiring a respective sensor variable, depending on which the fluid variable can be ascertained by the computing device. The sensor module or the sensor modules is/are connected by at least two wires in each case to respective sensor contacts of the computing device. At least one of the sensor contacts is coupled by a respective capacitance to a reference circuit segment lying at a reference potential, in particular the ground potential, and the reference circuit segment is insulated with respect to direct current from the sensor contacts.

8 Claims, 1 Drawing Sheet

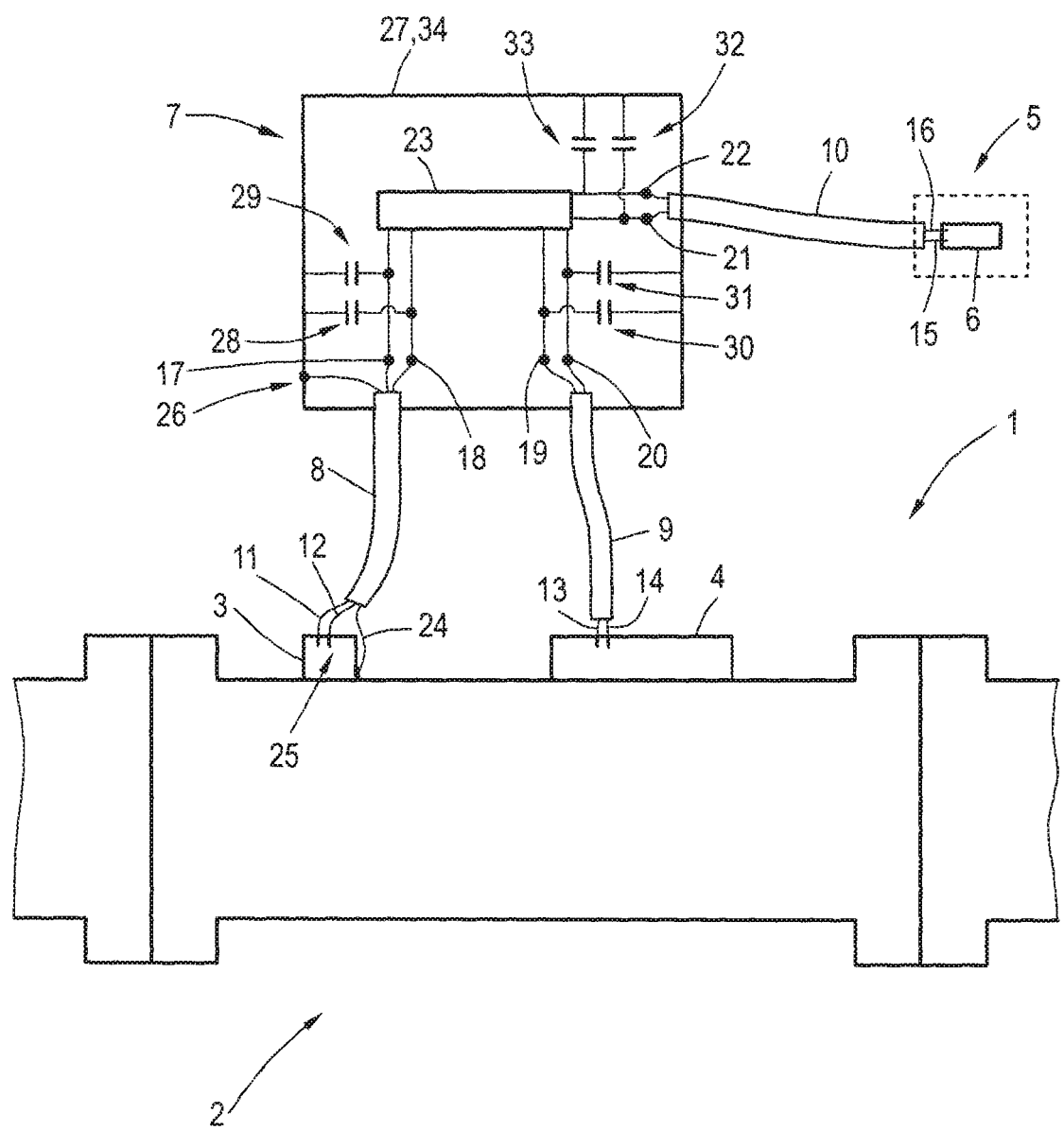

MEASUREMENT DEVICE FOR ASCERTAINING A FLUID VARIABLE RELATING TO A FLUID AND/OR A FLUID FLOW

CROSS-REFERENCE TO RELATED APPLICATION

This application is a continuation, under 35 U.S.C. § 120, of copending International Application PCT/EP2018/000342, filed Jul. 4, 2018, which designated the United States; this application also claims the priority, under 35 U.S.C. § 119, of German Patent Application DE 10 2017 007 494, filed Aug. 9, 2017; the prior applications are herewith incorporated by reference in their entirety.

BACKGROUND OF THE INVENTION

Field of the Invention

The invention relates to a measurement device for ascertaining a fluid variable relating to a fluid and/or a fluid flow of the fluid, including a computing device and a sensor module or a plurality of sensor modules for acquiring a respective sensor variable, depending on which the fluid variable can be ascertained by the computing device, in which the sensor module or the sensor modules is/are connected by at least two wires in each case to respective sensor contacts of the computing device.

Appropriate measurement devices can, for example, be flow meters that acquire a flow rate of a gas or of a fluid. If such flow rate metering is supplemented with temperature sensors for the acquisition of a forward feed and return feed temperature, the measurement device can serve to acquire a quantity of heat provided. Such a measurement device can include a plurality of components or modules. In addition to a computing device that can perform the data processing and/or storage, a sensor module or a plurality of sensor modules can be used to provide the sensor data from which the fluid variable is calculated. The sensor modules can be connected to the computing device by appropriate leads.

It can be problematic for the described configuration, that interference, for example high-frequency voltage or current pulses, is coupled into the respective lead that connects the computing device to the sensor module or the sensor modules. The measurement quality can be reduced thereby and in some circumstances damage to the measurement device can even occur. Two approaches have been taken to date to overcome such interference. Firstly, ferrite cores can be used at connecting leads in order to attenuate or to filter high-frequency interference. Secondly, it is possible to connect a signal ground used for communication with the respective sensor module directly to a ground potential provided externally to the measurement device, in which the ground potential is supplied, for example, by a pipe carrying the fluid. An adequate suppression of interference at the measurement device with the aid of those approaches can be relatively costly, and not all interference can be attenuated.

BRIEF SUMMARY OF THE INVENTION

It is accordingly an object of the invention to provide a measurement device for ascertaining a fluid variable relating to a fluid and/or a fluid flow, which overcomes the hereinafore-mentioned disadvantages of the heretofore-known devices of this general type and which improves or simplifies the suppression of interference at such a measurement device.

With the foregoing and other objects in view there is provided, in accordance with the invention, a measurement device for ascertaining a fluid variable relating to a fluid and/or a fluid flow of the fluid, comprising a computing device and a sensor module or a plurality of sensor modules for acquiring a respective sensor variable, depending on which the fluid variable can be ascertained by the computing device, the sensor module or the sensor modules is/are connected by at least two wires in each case to respective sensor contacts of the computing device, at least one of the sensor contacts is coupled by a respective capacitance to a reference circuit segment lying at a reference potential, in particular the ground potential, and the reference circuit segment is insulated with respect to direct current from the sensor contacts.

It is thus proposed that the sensor contacts, and thus the wires used to connect the sensor module or the sensor modules, are insulated with respect to direct current from the reference potential, but that at least one of the sensor contacts, preferably all of the sensor contacts, are coupled capacitively to the reference potential. This allows high-frequency interference on the wires to be dispersed to the reference potential or to the ground potential, without the nearly direct-current or low-frequency measurement signals being negatively influenced thereby. Thus, not only the signal grounds of the signals provided by the sensor modules can have interference suppressed, but also signal leads that have to lie at a defined potential in order to be able to transmit signals. Since the suppression of interference takes place by the sensor contacts, and thus centrally by way of the computing device, a formation of ground loops or the like can be avoided.

The insulation of the reference circuit segment from the sensor contacts is preferably chosen in such a way that a direct current resistance of more than one megohm results even at higher voltages of, for example, several tens or hundreds of volts. The respective capacitance for coupling the sensor contact to the reference circuit segment can be realized as a separate component, in particular as a capacitor. The capacitance can, however, also be realized by, for example, conductive segments of the reference circuit segment and of a circuit segment connected to the respective sensor contact lying flat against one another.

A resistor can be connected in series with the capacitance to limit the current flow that can be dispersed to the reference potential. In addition or alternatively, an inductance can also be connected in series with the capacitance, for example in order to form an absorber circuit with which interference at a particular frequency can be specifically suppressed.

The ground potential of the conductive ground in the region of the measurement device can be used as the reference potential. The ground potential can, in particular, correspond to the electric potential at which a conductive fluid or a conductive measurement tube that carries the fluid is located. The fluid can be a liquid, for example water, or a gas.

The sensor module or one of the sensor modules can include a sensor component that, in the installed state, is conductively coupled to the reference potential provided externally to the measurement device, wherein the sensor component is conductively coupled by a further wire to the reference circuit segment of the computing device. The further wire can be conductively connected to the reference circuit segment by a contact point. Interference that is coupled into a wire that is connected to one of the sensor contacts can thus initially be passed by this wire to the computing device and from there by the associated capacitance to the reference circuit segment, from where it can be dispersed by the further wire by the reference potential provided externally to the measurement device. The connection between the further wire and the sensor component and/or the reference circuit segment is, in particular, of low resistance.

The sensor component can form at least a segment of a housing of the sensor module and/or of a measurement tube that accommodates the fluid or through which the fluid can flow. In particular, if a conductive, in particular metal, measurement tube is used, and/or if the fluid itself is conductive, the reference potential can be provided by way of the conductive fluid or the measurement tube. The sensor component can, in particular as part of the housing of the sensor module, be connected, for example screwed, to a conductive measurement tube, for example, or to another conductive component lying at the reference potential. Due to the formation of the sensor component as a housing segment or measurement tube segment, the measurement device can be coupled with little technical effort in a low-resistance manner to a reference potential provided externally to the measurement device.

As explained previously, the reference potential of the reference circuit segment can be given in that the reference circuit segment is conductively connected by a further wire to a sensor component of a sensor module which, in the installed state, is conductively coupled to the reference potential provided externally to the measurement device. This further wire, and the wires discussed above that connect this sensor module to the sensor contacts of the computing device, can be part of a common lead that connects this sensor module to the computing device. The further wire can in this case form the screen of the lead to screen those wires that connect the sensor module to the sensor terminals against external interference. The sensor module that includes the sensor component can thus be coupled by a lead that includes the wires connecting the sensor module to the sensor contacts and the further wire to the computing device. The further wire can form a screen for those wires that connect the sensor module to the sensor contacts. The further wire can be connected at the computing device end to a contact point of the reference circuit segment and at the sensor device end to a contact point of the sensor component, e.g. a housing of the sensor module. The further wire can, for example, be implemented in the region of the lead in the form of a hollow cylinder, and the other wires can be guided inside this hollow cylinder. A coupling of interference into the wires that are connected to the sensor contacts can already be suppressed to a large extent by forming a screen using the further wire. Interference coupled into the further wire can be dispersed directly by the low-resistance connection to the reference potential provided externally to the measurement device. Inasmuch as interference is coupled into the wires that connect the sensor module to the sensor contacts in spite of the screening, it can be dispersed by the capacitances as already explained.

The measurement device can include a flow sensor and/or at least one temperature sensor as sensor modules. The flow sensor can, for example, be a thermal flow sensor, a vane sensor or an ultrasonic sensor. A measurement resistor, for example a platinum resistor, can in particular be used as a temperature sensor, wherein a voltage drop at the temperature sensor can be acquired by the wires. A forward feed-side temperature sensor and a return feed-side temperature sensor and a flow meter can be used to construct a heat meter. The ground potential can, for example, be made available by the housing of a temperature sensor that can be screwed into a measurement tube in order to acquire the temperature of the fluid.

The flow sensor and one of the temperature sensors can be disposed as a common unit at the measurement tube, wherein a further temperature sensor is disposed at a distance therefrom in order to perform a remaining temperature measurement for acquisition of heat that is supplied or withdrawn.

The computing device can be configured to ascertain a flow rate of fluid or a quantity of energy transported by the fluid as a fluid variable. A quantity of energy can, for example, be ascertained depending on a temperature difference between two temperatures acquired by different temperature sensors and a flow rate that can be acquired by a flow sensor.

A heat meter can, for example, include two temperature sensors for measuring the forward-feed and return-feed temperature in a heating circuit. One of the two temperature sensors can be connected to the computing device by a short cable and screwed directly into a connector housing. This cable can be implemented in a screen form, wherein the screen is connected in a low-resistance manner to the connector housing in order to connect the heat meter to the ground potential. The individual inputs and outputs of the computing device are coupled capacitively to this screen by a reference circuit segment in order to disperse cable-borne interference by the screen to the ground potential.

In the measurement device according to the invention, it is particularly advantageous if each of the sensor contacts is coupled by a respective capacitance to the reference circuit segment. In this case, cable-borne interference of all of the wires used for connecting the sensor modules can be dispersed. For at least one of the sensor modules, both a wire that serves as a signal ground and also at least one further wire that carries a control signal or measurement signal can be coupled by a respective capacitance to the reference circuit segment.

Other features which are considered as characteristic for the invention are set forth in the appended claims.

Although the invention is illustrated and described herein as embodied in a measurement device for ascertaining a fluid variable relating to a fluid and/or a fluid flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

The FIGURE of the drawing is a fragmentary, diagrammatic, side-elevational view of a measurement tube and a schematic diagram of a computing device of a measurement device.

DETAILED DESCRIPTION OF THE INVENTION

Referring now in detail to the single FIGURE of the drawing, there is seen a measurement device 1 which serves in this example to ascertain a quantity of heat provided by way of a fluid. The fluid is supplied on the forward-feed side by a measurement tube 2. The temperature of the fluid is acquired in the region of the forward feed by a first sensor module 3, and a flow rate is acquired by a second sensor module 4, for example by using a thermal flow meter. In a region 5 of a return feed, which is only schematically shown, the temperature of the returning fluid is acquired by a sensor module 6. The sensor modules 3, 6 for temperature acquisition are, for example, thermal resistors.

A respective lead 8, 9, 10 is used to connect the sensor modules 3, 4, 6 to a computing device 7. The leads 8, 9, 10 each include in this example two wires 11 to 16 that are connected at the computing device end to respective sensor contacts 17 to 22. The wires 11 to 16 are connected by these contacts to a processing circuit 23 which, for example, supplies current to the thermal resistors of the sensor modules 3, 6 and measures the voltage being dropped across them, or operates the sensor module 4 for flow measurement. In regard to the sensor module 4 in particular, it is possible in this case for more than two wires 13, 14 to be used for operation of the sensor module 4.

In the measurement device shown, interference should be dispersed to a reference potential, namely the ground potential, at which the measurement tube 2 lies. A further wire 24 is used in the lead 8 for this purpose. In a low-resistance manner, one end of the further wire 24 contacts a sensor component 25, namely a housing of the sensor module 3, and another end of the further wire 24 contacts a contact point 26 at a conductive housing 27 of the computing device 7. The housing of the sensor module 3 is screwed into the measurement tube 2 and therefore contacts it in a low-resistance manner. The housing 27 of the computing device 7 is thus pulled by a low-resistance connection to the ground potential at which the conductive measurement tube 2 also lies, so that interference can be dispersed to this ground potential.

The lead 8 is advantageously constructed in such a way that the further wire 24 forms a screen for the wires 11 and 12, so that they are also screened.

In order to be able to disperse interference that is introduced into the wires 11 to 16 to the reference potential or ground potential, each of the sensor contacts 17 to 22 in the computing device 7 is connected by a respective capacitance 28 to 33, formed by a capacitor, to a reference circuit segment 34, which is formed by the conductive housing 27. All of the wires 11 to 16 are thus capacitively coupled to the reference potential or ground potential, so that high-frequency interference can be dispersed by the capacitances 28 to 33, the reference circuit segment 34 formed by the housing 27, the further wire 24, the housing of the sensor module 3 and the measurement tube 2. Such interference thus does not couple into the processing circuit 23, but rather is dispersed past this circuit to the reference potential.

The following is a summary list of reference numerals and the corresponding structure used in the above description of the invention:
1 Measurement device
2 Measurement tube
3 Sensor module
4 Sensor module
5 Region
6 Sensor module
7 Computing device
8 Lead
9 Lead
10 Lead
11 Wire
12 Wire
13 Wire
14 Wire
15 Wire
16 Wire
17 Sensor contact
18 Sensor contact
19 Sensor contact
20 Sensor contact
21 Sensor contact
22 Sensor contact
23 Processing circuit
24 Wire
25 Sensor component
26 Contact point
27 Housing
28 Capacitance
29 Capacitance
30 Capacitance
31 Capacitance
32 Capacitance
33 Capacitance
34 Reference circuit segment

The invention claimed is:

1. A measurement device for ascertaining a fluid variable relating to at least one of a fluid or a fluid flow of the fluid, the measurement device comprising:
   a computing device having sensor contacts;
   at least one sensor module for acquiring a respective sensor variable;
   said computing device configured to ascertain the fluid variable in dependence on the sensor variable;
   at least two wires respectively connecting said at least one sensor module to at least one of said sensor contacts of said computing device;
   a reference circuit segment lying at a reference potential, said reference circuit segment being insulated relative to direct current from said sensor contacts; and
   at least one capacitance respectively coupling at least one of said sensor contacts to said reference circuit segment.

2. The measurement device according to claim 1, wherein the reference potential is ground potential.

3. The measurement device according to claim 1, wherein:
   the reference potential is provided externally to the measurement device;
   said at least one sensor module includes a sensor component being conductively coupled to the reference potential in an installed state; and
   a further wire conductively couples said sensor component to said reference circuit segment of said computing device.

4. The measurement device according to claim 3, which further comprises a measurement tube accommodating the fluid or the fluid flow through said measurement tube, said sensor component forming at least a segment of a housing of at least one of said at least one sensor module or said measurement tube.

5. The measurement device according to claim 3, which further comprises:
   a lead including said further wire and said wires connecting said at least one sensor module to said sensor contacts;

said at least one sensor module including said sensor component being coupled by said lead to said computing device; and said further wire forming a screen for said wires connecting said at least one sensor module to said sensor contacts.

6. The measurement device according to claim 1, which further comprises at least one of a flow sensor or at least one temperature sensor forming said at least one sensor module.

7. The measurement device according to claim 1, wherein said computing device is configured to ascertain a flow rate of the fluid or a quantity of energy transported by the fluid as the fluid variable.

8. The measurement device according to claim 1, wherein said at least one capacitance is a plurality of capacitances each coupling a respective one of said sensor contacts to said reference circuit segment.

* * * * *